2 Sheets—Sheet 1.
J. M. HEAGLE.
CRACKER MACHINE.
No. 689. Patented Apr. 13, 1838.
*Principal Side-View.*
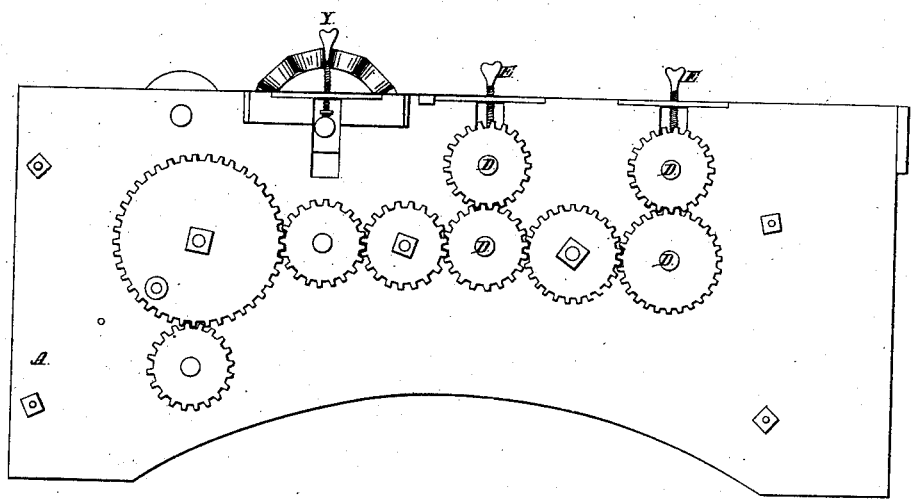
*Top View.*
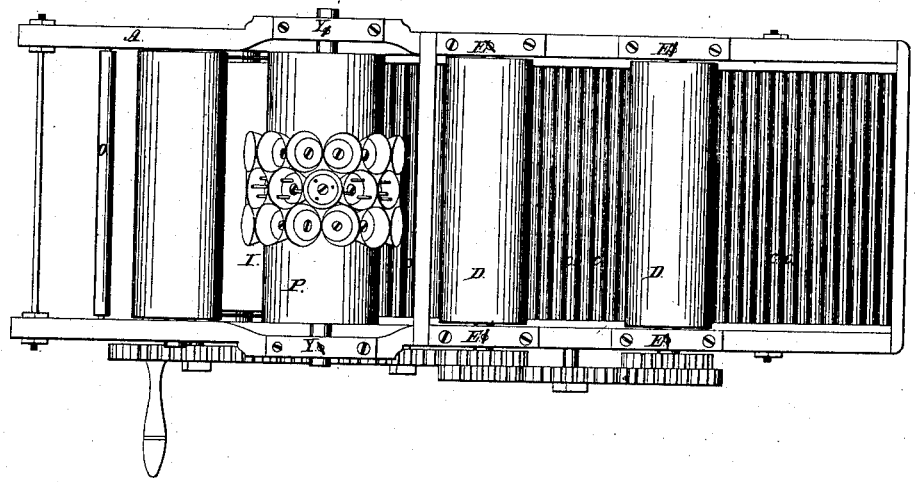

2 Sheets—Sheet 2.
J. M. HEAGLE.
CRACKER MACHINE.
No. 689.          Patented Apr. 13, 1838.
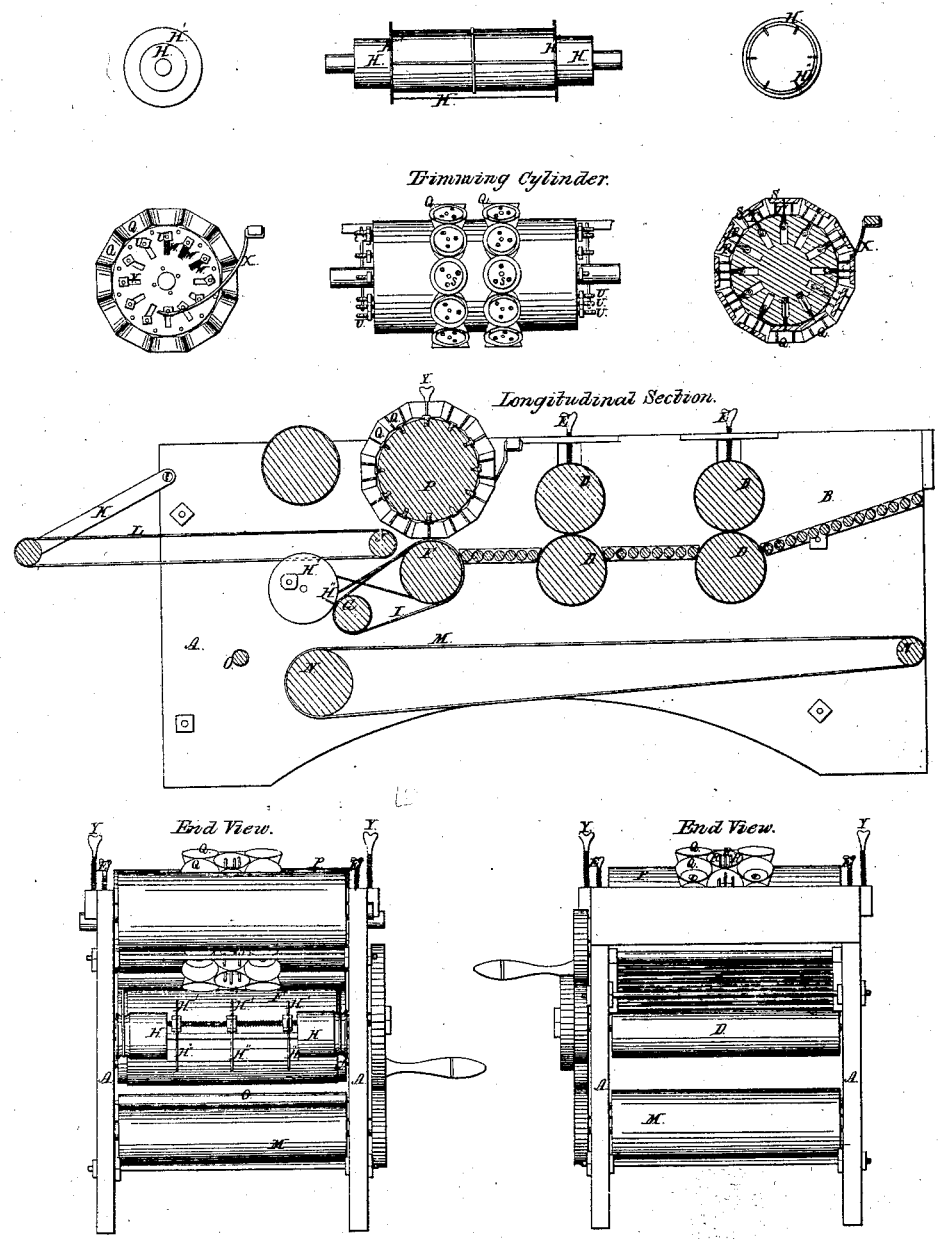

UNITED STATES PATENT OFFICE.

JOHN M. HEAGLE, OF NEW HAVEN, CONNECTICUT.

MACHINE FOR PLATING DOUGH AND CUTTING CRACKERS, CAKES, PILOT-BREAD, &c.

Specification of Letters Patent No. 689, dated April 13, 1838.

*To all whom it may concern:*

Be it known that I, JOHN M. HEAGLE, of New Haven, in the county of New Haven and State of Connecticut, have invented a new, improved, and useful Machine for Plating Dough and Forming Cakes, Crackers, or Pilot-Bread Ready for the Oven at One Operation.

The principle of the invention and the operation of the machine, is to cause the dough placed in the hopper to pass between two sets of plating rollers and thence over one or more bed-rollers on which forming and trimming cylinder may operate to give the stamp or print and shape intended, and thence discharge it upon baking pans, ready for the oven, by simply turning the crank or otherwise moving the machinery.

To enable others skilled in the art to make and use my invention, I more particularly describe its construction and operation as follows, including however some parts which I do not separately claim.

The frame of my machine consists of two planks A, about three feet wide and about twelve feet long, set on one edge, upon a strong table, standing parallel to each other, about thirty inches apart, held in place by four cross bars or girts. These dimensions will vary according to the size intended whether for one or more rows of pans. At the end of this frame on the right as you stand in front, I make the hopper B. The frame forming two sides, the first pair of feeding and plating rollers forming the side next to the machinery on the left. The bottom and the end side of the hopper, I make of small friction rollers, extending across the frame, having their ends inserted so as to roll freely, and commencing a little below the junction of the plating rollers, and rising with an elevation of about fifteen degrees to the end of the frame.

For the purpose of bringing the dough to its proper shape and thickness for cutting or printing, I place two pair of feeding and plating rollers D, about fifteen inches in diameter, the rollers of each pair being placed one above the other in common form, extending across the frame, and having their axes inserted into the sides of the frame. These rollers are covered with fine soft cloth to prevent the adhesion of dough, and each pair is regulated by set screws E on the top of the frame. The rollers adjoining the hopper are made to move a little slower than the others, that the second pair may draw the dough and make it smooth. The second pair are placed about nine inches forward of the first, and at the same distance forward of them, is the bed rollers F of the forming cylinders hereinafter described. These bed rollers are all of the same diameter, and all placed in a horizontal line, and the spaces between them filled with small rollers, like those forming the bottom of the hopper, to lessen friction in the progress of the plate.

Forward of the bed roller F of the forming cylinder about twelve inches and near the discharging end of the machine, I place a bed roller G for the trimming cylinder. This bed roller should not exceed two or three inches in diameter and is placed so far below the level of the bed roller of the forming cylinder that when connected with that, by an endless cloth, around both, the apron will form an inclined plane of about forty five degrees to carry the cards or cakes or crackers from the forming cylinders to the pans beneath without injury.

The bed rollers for the forming and for the trimming cylinders are both covered with an elastic substance to prevent injury from the cutters. The trimming cylinder is carried by cords from the bed rollers of the forming cylinder, and is armed with circular knives H' at each end and in the middle, and one or more horizontal knives H'' running lengthwise of the cylinder. These horizontal knives are attached by screws and may be one or more according to the size of the cylinder and of the card required. The cards as they are trimmed fall on the pans for baking, and the trimmings upon the table for remolding.

The trimming cylinder is to be removed when crackers or pilot-bread are discharged separately from the forming cylinders, and the cakes or crackers thus discharged pass down the inclined apron to the pans, and the scraps and trimmings from the forming cylinders are taken off horizontally in the following manner. A delivering table for scraps and trimmings is formed by an endless cloth I around two rollers, one of which J is inserted in the frame near the discharging end; above the bed-roller of the trimming cylinder and a little above a horizontal line with the top of the bed-roller of the forming cylinders and so far forward of it, as to leave room for the discharge of crackers beneath it. This roller is connected with the gearing which gives motion to the machine. The other roller of this delivering table is supported in place by two arms K extending forward horizontally from the frame a sufficient length to admit the pans as they are filled to be taken from underneath it. The scraps and trimmings being once conducted to this table, are carried forward on this endless cloth L and are thence delivered into a box for further use. When cakes or cards are made which require the use of the trimming cylinder, this delivering table is removed and the trimming cylinder is put in place.

For the purpose of carrying forward the baking pans, to receive the cakes, cards ar crackers as they are discharged from the inclined plane: I place underneath all the above described bed-rollers, a horizontal feed table, made by an endless cloth M around two rollers, N one placed under the hopper, the other a little below, and forward of, the bed roller of the trimming cylinder, and is there connected with the moving power of the machinery. The pans are placed on this feed table under the hopper, and are carried forward to the discharging end of the machine, and there receive the cakes, cards or crackers as they pass off from the inclined plane above described. A small roller O in front steadies the pans till they are filled and taken away.

The forming cylinders for cakes or cards may be of the same diameter as the bed rollers, and are armed with flutes, reeds, or honeycomb circles or other suitable dies, to imprint upon the plate any device required. Several may be necessary for the different devices, to be used separately. The cards formed by these are trimmed on the sides and separated by the trimming cylinders. The forming cylinder P for crackers and pilot-bread should be larger. They may be two feet or more in diameter, that the forming cutters may the better perform their office and discharge their cuttings in good shape, separate from the scraps. These cylinders are made hollow and the circular cutters Q of suitable size for crackers, or for pilot bread, are made fast upon the outside, in rows around, and lengthwise of, the cylinder, leaving a small space around each to connect the scraps. Within each of these circular cutters a suitable number of wire points R are firmly fixed to the bottom, and rising to the top, to prick the dough ready for baking, and also a piston S to discharge the cracker from the cutter. This discharging piston has holes in it corresponding with the wire points on which it moves up and down, controlled by a piston rod T attached to it, and to a bar U within the cylinder. This bar runs through the cylinder lengthwise and through the head of the cylinder at each end and plays up and down in a mortise V made for that purpose in each head, and is attached to a piston from each cutter in the row under which it is placed. Each row of cutters has a similar bar connected with similar pistons, and thereby each piston in the row may be raised to the top or lowered to the bottom of its circular cutter. These bars in their ordinary position are raised to the top of the mortise in which they move by spiral or other springs W within the body of the cylinder, and thereby raise the pistons nearly to the top of the cutters and as the cylinder revolves, the projecting ends of these bars, slide and rise in circular lips X projecting from the inside of the frame, about a quarter circle, whereby the bar and with it the pistons are drawn back while the cutters are in contact with the bed roller: and as soon as the cutters have done their work, the bar slips from the lips, and the springs within force the bar to the top of the mortise, and thereby the pistons discharge the crackers from the cutters onto the inclined plane in front, which carries them to the pans: and the scraps are carried forward on the delivering table as above stated for remolding.

The axes or shaft of the several bed rollers and of one of the feed table and one of the discharging table rollers should project through the frame in front to receive pinion wheels or pulleys with both in common form, all connected with a crank or other moving power and calculated to give uniform motion to all the parts, except the first pair of plating rollers which should be made to move a little slower as stated above. The forming cylinders are also held in place and regulated to the thickness of the plate by set screws Y on the top of the frame.

For further illustration I refer to the drawings with references accompanying this specification as part thereof.

I do not claim as my invention or improvement the plating rollers, nor the feed or delivering tables as such, nor a forming cylinder armed with cutters for crackers or pilot bread, or with dies for cakes nor the gear attached to the machine, but

I claim as my invention and improvement;

1. The friction rollers for the bottom of the hopper, and for the table between the bed rollers as above specified.

2. I also claim the trimming cylinder, in combination as above specified.

3. I also claim the mode of forcing out the pistons, in the manner described, thereby discharging the cutters as above specified.

4. I also claim the combination of the several parts claimed separately as above, so far as they have a connected action as above specified, and therefore I solicit Letters Patent.

March 1st 1838.

JOHN M. HEAGLE.

Witnesses:
SIMEON BALDWIN,
JULIUS AUSTIN.